(12) United States Patent
Tan et al.

(10) Patent No.: US 9,691,355 B2
(45) Date of Patent: Jun. 27, 2017

(54) METHOD OF READING DATA, METHOD OF TRANSMITTING DATA AND MOBILE DEVICE THEREOF

(71) Applicant: NOVATEK Microelectronics Corp., Hsin-Chu (TW)

(72) Inventors: Teng-Yang Tan, Hsinchu (TW); Chun-Yi Chou, Hsinchu (TW)

(73) Assignee: NOVATEK Microelectronics Corp., Hsin-Chu (TW)

( * ) Notice: Subject to any disclaimer, the term of this patent is extended or adjusted under 35 U.S.C. 154(b) by 83 days.

(21) Appl. No.: 13/975,361

(22) Filed: Aug. 25, 2013

(65) Prior Publication Data

US 2014/0306968 A1    Oct. 16, 2014

(30) Foreign Application Priority Data

Apr. 12, 2013   (TW) .............................. 102113134 A

(51) Int. Cl.
*G06T 1/60* (2006.01)
*G09G 5/12* (2006.01)
*G06F 3/14* (2006.01)
*G09G 5/00* (2006.01)

(52) U.S. Cl.
CPC ............. *G09G 5/12* (2013.01); *G06F 3/1431* (2013.01); *G09G 5/006* (2013.01); *G09G 2310/0232* (2013.01); *G09G 2370/08* (2013.01); *G09G 2370/10* (2013.01)

(58) Field of Classification Search
CPC .... H04N 5/08; G09G 5/12; G09G 2310/0232; G09G 5/006; G06F 3/1431
USPC .................................... 348/545; 345/691, 99
See application file for complete search history.

(56) References Cited

U.S. PATENT DOCUMENTS

| | | | |
|---|---|---|---|
| 7,250,724 B2 | 7/2007 | Kim | |
| 2011/0037758 A1* | 2/2011 | Lim | H03L 7/0805 345/213 |
| 2013/0044089 A1 | 2/2013 | Chang-Chian | |
| 2013/0057763 A1* | 3/2013 | Cha et al. | 348/554 |
| 2013/0155260 A1* | 6/2013 | Kim | H04N 7/183 348/207.1 |
| 2014/0063033 A1* | 3/2014 | Bae et al. | 345/545 |
| 2015/0054863 A1* | 2/2015 | Tanaka et al. | 345/691 |

FOREIGN PATENT DOCUMENTS

CN        102982759 A       3/2013

* cited by examiner

*Primary Examiner* — Abbas Abdulselam
(74) *Attorney, Agent, or Firm* — Winston Hsu

(57) ABSTRACT

A method of reading data for a display drive IC of a panel is provided. The method includes receiving a write format and at least one image packet, generating a synchronization signal according to the write format, and reading data of the at least one image packet according to the synchronization signal such that the panel uses a video mode to display the data of the at least one image packet.

17 Claims, 9 Drawing Sheets

METHOD OF READING DATA, METHOD OF TRANSMITTING DATA AND MOBILE DEVICE THEREOF

BACKGROUND OF THE INVENTION

1. Field of the Invention

The present invention relates to a method of reading data, method of transmitting data and mobile device thereof, and more particularly, to a method of reading data, method of transmitting data and mobile device thereof having a RAM-less display drive integrated circuit which uses a video mode to read image data.

2. Description of the Prior Art

A mobile industry processor interface (hereafter called MIPI) is commonly utilized in a mobile device for handling data transmission and reception between a processor and a display drive integrated circuit (IC) of the mobile device. The display drive IC may receive and read data transmitted from the processor, named host, according to the MIPI, such that the display drive IC drives a panel of the mobile device to display the data. The MIPI defines two application modes, one is a video mode and the other is a command mode. Basic hardware designs are made according to protocols based on the two modes, which significantly determine an optimization consideration between a production cost, a mechanical structure, a product size and a power consumption of the mobile device.

When using the video mode, a display drive IC without a random access memory (RAM), which refers to a RAM-less drive IC, may receive a vertical synchronization signal, a horizontal synchronization signal and image packets transmitted from the processor to refresh images on the panel synchronous with processor, such that the panel displays the images instantly. However, in such a structure, the processor has to continuously monitor a request from an operating system for updating images, transmit image packets to the display drive IC, and maintain an operation of the panel. Even in a static image, the processor has to transmit image packets to the display drive IC to maintain the operation of the panel, which not only wastes system resources of the mobile device but also increases the power consumption of the mobile device and leads to a risk of heat crash.

On the other, when using the command mode, the processor transmits the image packets to the display drive IC only when the image needs to be updated, and the processor does not transmit the vertical and horizontal synchronization signals to the display drive IC, which saves power consumption compared with the video mode. However, in such a structure, the display drive IC has to store image data in a built-in storage, such as a static random access memory (SRAM), and generate a vertical synchronization signal and a horizontal synchronization signal by itself to drive the panel displaying data of image packets, which increases a circuit area and a production cost of the display drive IC.

Therefore, how to pick up an advantage of having the RAM-less drive IC under the video mode and an advantage of power saving under the command mode in the MIPI, and exclude disadvantages of the video and command modes as much as possible, which has become a topic of the industry.

SUMMARY OF THE INVENTION

It is therefore an objective of the present invention to provide a method of reading data, method of transmitting data and mobile device thereof having a ream-less display drive integrated circuit which uses a video mode to read image data, so as to pick up the advantage of having the ram-less drive IC under the video mode and the advantage of power saving under the command mode.

The present invention discloses a method of reading data for a display drive IC of a panel. The method includes receiving a write format and at least one image packet, generating a synchronization signal according to the write format, and reading data of the at least one image packet according to the synchronization signal such that the panel uses a video mode to display the data of the at least one image packet.

The present invention further discloses a method of transmitting data for a processor of a mobile device. The method includes retrieving information of an active area and a non-active area of a panel of the mobile device, generating at least one image packet according to the information, and using a command mode to transmit a write format and the at least one image packet to a display drive IC of the panel.

The present invention further discloses a mobile device. The mobile device includes a storage for storing a program code corresponding to a method of transmitting data, a processor coupled to the storage for processing the program code to execute the method of data transmission and a display drive IC coupled between the panel and the processor for executing a process of reading data to read data of the at least one image packet. The method of transmitting data includes retrieving information of an active area and a non-active area of a panel of the mobile device, generating at least one image packet according to the information, and using a command mode to transmit a write format and the at least one image packet to a display drive IC of the panel. The process of reading data includes receiving the write format and the at least one image packet, generating a synchronization signal according to the write format, and reading data of the at least one image packet according to the synchronization signal such that the panel uses a video mode to display the data of the at least one image packet.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
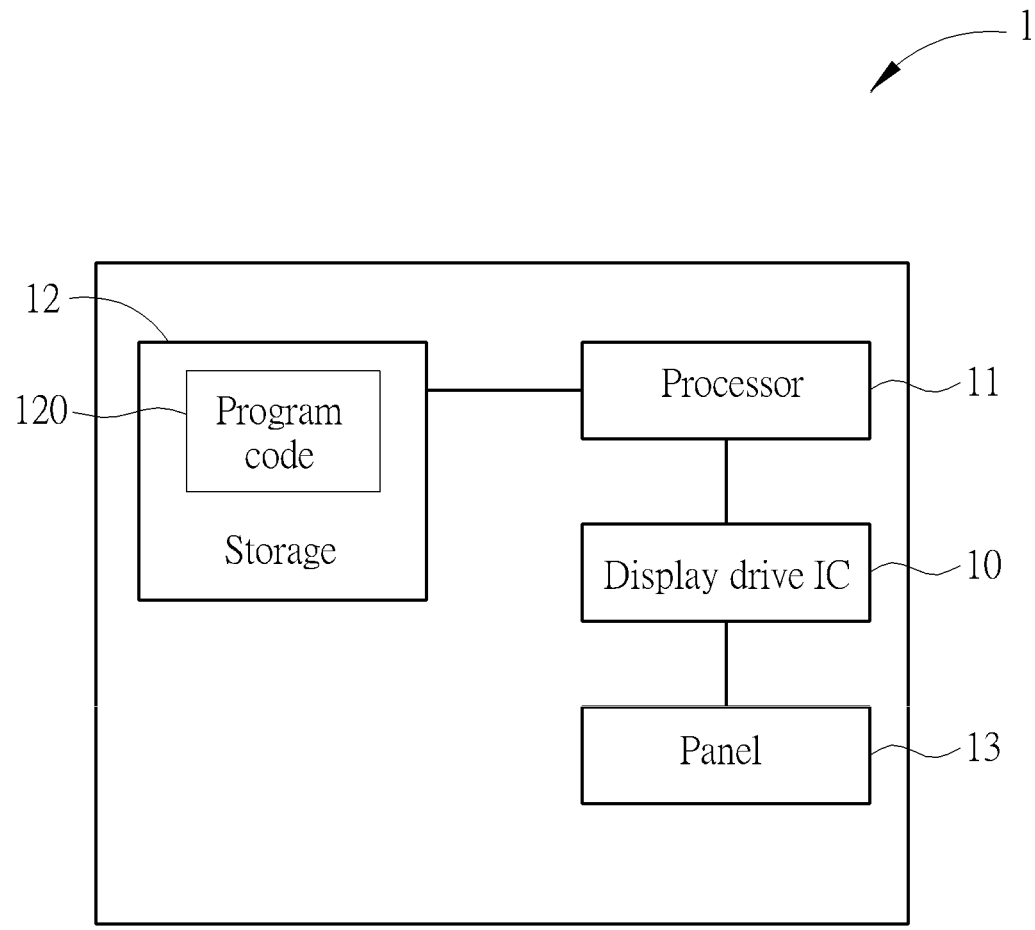
FIG. 1 is a schematic diagram of a mobile device 1 according to an embodiment of the present invention.

Please refer to FIG. 1, which is a schematic diagram of a mobile device 1 according to an embodiment of the present invention. The mobile device 1 may be a mobile device supporting a mobile industry processor interface (MIPI). The mobile device 1 may include a processor 11 such as a microprocessor or Application Specific Integrated Circuit (ASIC), a storage 12, a display drive IC 10 and a panel 13. The storage 12 may be any data storage device that can store a program code 120 for access by the processor 11. Examples of the storage 12 include but are not limited to a read-only memory (ROM), flash memory, random-access memory (RAM), and optical data storage device. The display drive IC 10 may receive frame data or image packets transmitted from the processor 11 for driving the panel 13 to display pictures and images accordingly.

Figure 2:
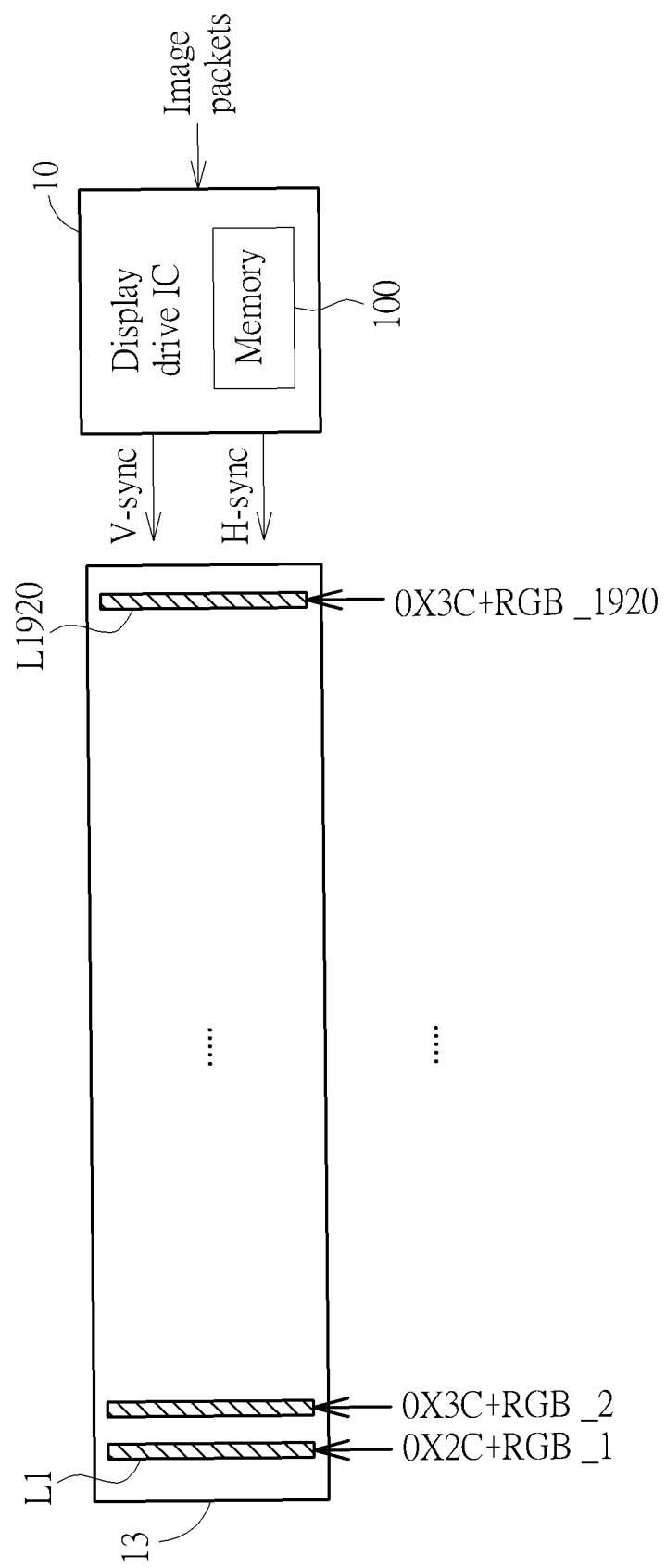
FIG. 2 is a schematic diagram illustrating the display drive IC shown in FIG. 1 using a command mode to read image packets.

Please refer to FIG. 2, which is a schematic diagram illustrating the display drive IC 10 using a command mode to read image packets. The display drive IC 10 includes a memory 100 for storing image packets and frame data transmitted by the processor 11. Take frame data with a resolution 1080RGB×1920 for example, the panel 13 may be divided into 1920 display lines L1-L1920, each of the display lines L1-L1920 includes 1080 pixels. According to protocols based on the command mode, the processor 11 may sequentially transmit the following image packets and corresponding write formats to the display drive IC 10:

write format 0X2C, image packet RGB_1
   write format 0X3C, image packet RGB_2
   . . .
   write format 0X3C, image packet RGB_1920

Once the display drive IC 10 reads the write format 0X2C, the display drive IC 10 may know that the following image packet is the first image packet RGB_1, and the display drive IC 10 may store the active packet RGB_1 from an origin of a memory block corresponding to the first display line L1 of the panel 13 in the memory 100. Until the display drive IC 10 reads the write format 0X3C, the display drive IC 10 may fill the rest of the memory block, which is empty and corresponding to the first display line L1 of the panel 13, with null data or blank data. Afterwards, the display drive IC 10 may store data of the second image packet RGB_2 from an origin of a memory block corresponding to the second display line L2 of the panel 13 in the memory 100, and so on. After all of the data of the image packets RGB_1-RGB_1920 are stored, the display drive IC 10 may drive the panel 13 to display the data of the image packets RGB_1-RGB_1920 according to a vertical synchronization signal V-sync and a horizontal synchronization signal H-sync generated by itself.

On the other hand, in the MIPI, a difference between the command mode and the video mode is that the video mode defines an active area and a non-active area of the panel 13 and packet formats corresponding to the active and non-active areas. Meanwhile, the video mode also defines synchronization signals corresponding to the active and non-active areas, such that the processor 11 and the display drive IC may communicate with each other to synchronously refresh images. The packet formats corresponding to the non-active area may be such as a vertical back porch VBP, a vertical front porch VFP, a horizontal back porch HBP and a horizontal front porch HFP.

Figure 3:
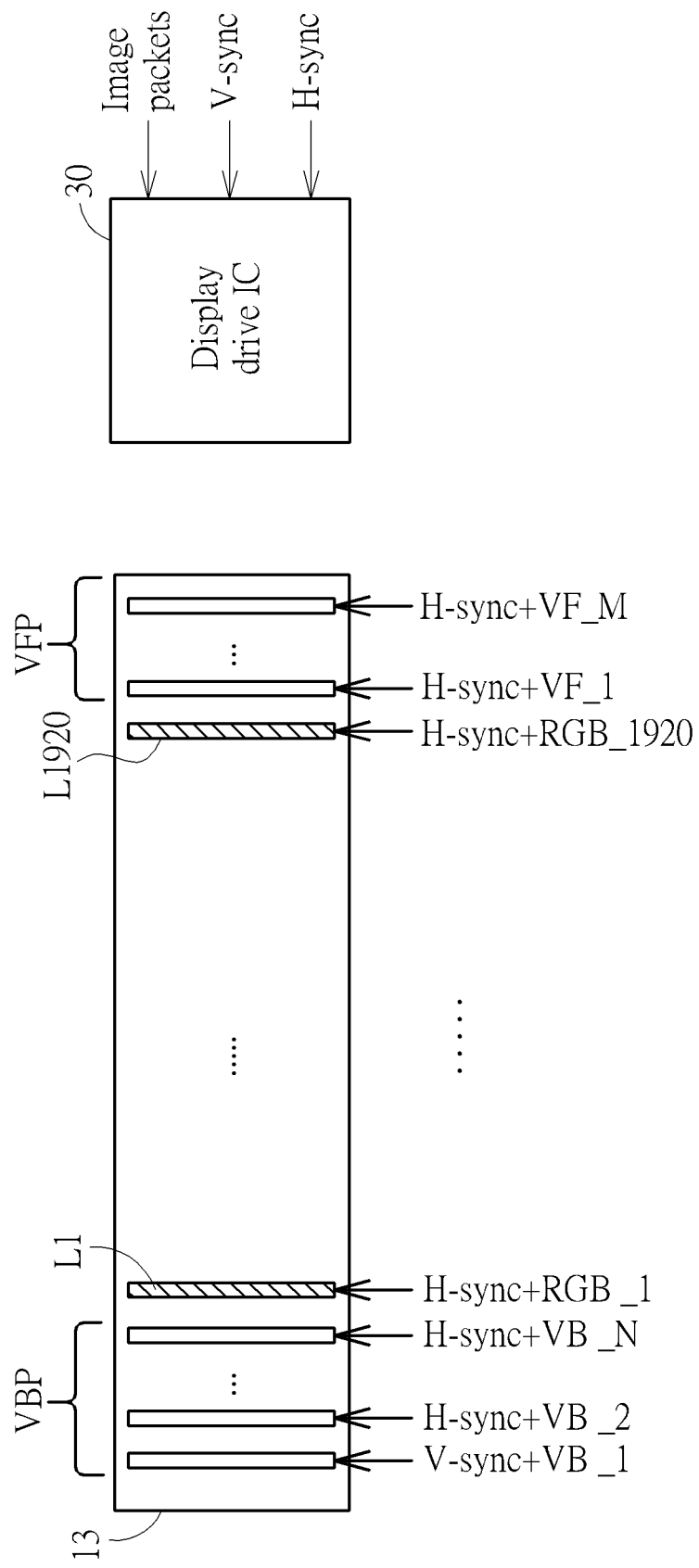
FIG. 3 is a schematic diagram illustrating a RAM-less display drive IC reading image packets in the video mode.

Please refer to FIG. 3, which is a schematic diagram illustrating a RAM-less display drive IC 30 reading image packets in the video mode. In FIG. 3, the display lines L1-L1920 having slash patterns may indicate an active area; while blank display lines may indicate a non-active area. Assume a resolution of the panel 13 is 1080RGB×1920, a data amount of a vertical back porch VBP of the non-active area is 1080RGB*(N), a data amount of a vertical front porch VFP of the non-active area is 1080RGB*(M). According to protocols based on the video mode, the processor 11 may sequentially transmit the following signals and image packets to the display drive IC 30:

vertical synchronization signal V-sync, non-active packet VB_1
   . . .
   horizontal synchronization signal H-sync, non-active packet VB_N
   horizontal synchronization signal H-sync, active packet RGB_1
   . . .
   horizontal synchronization signal H-sync, active packet RGB_1920
   horizontal synchronization signal H-sync, non-active packet VF_1
   . . .
   horizontal synchronization signal H-sync, non-active packet VF_M Before the display drive IC 30 receives the first active packet RGB_1, the non-active packets VB_1-VB_N are defined as the vertical back porch VBP. After the display drive IC 30 receives the last active packet RGB_1920, the non-active packets VF_1-VF_M are defined as the vertical front porch VFP. The vertical back porch VBP and the vertical front porch VFP correspond to the non-active area of the panel 13, which may be regarded as a synchronization buffer between the display drive IC 30 and the processor 11 for ensuring the display drive IC 30 may synchronously drive panel 13 to display the active packets RGB_1-RGB_1920 when the active packets RGB_1-RGB_1920 are arriving at the display drive IC 30.

In order to pick up the advantage of the ram-less drive IC under the video mode and an advantage of self generating synchronization signals under the command mode, the active and non-active areas of the panel 13 of the present invention may be defined, and the processor 11 may generate active packets and non-active packets according to the protocols based on the command mode after information of the active and non-active areas of the panel 13 is retrieved. Therefore, the display drive IC may generate the synchronization signals V-sync and H-sync according to write formats corresponding to the non-active packets VB_1-VB_N, the non-active packets VF_1-VF_M and the active packets RGB_1-RGB_1920, so as to drive the panel 13 to display the active packets RGB_1-RGB_1920.

Figure 4:
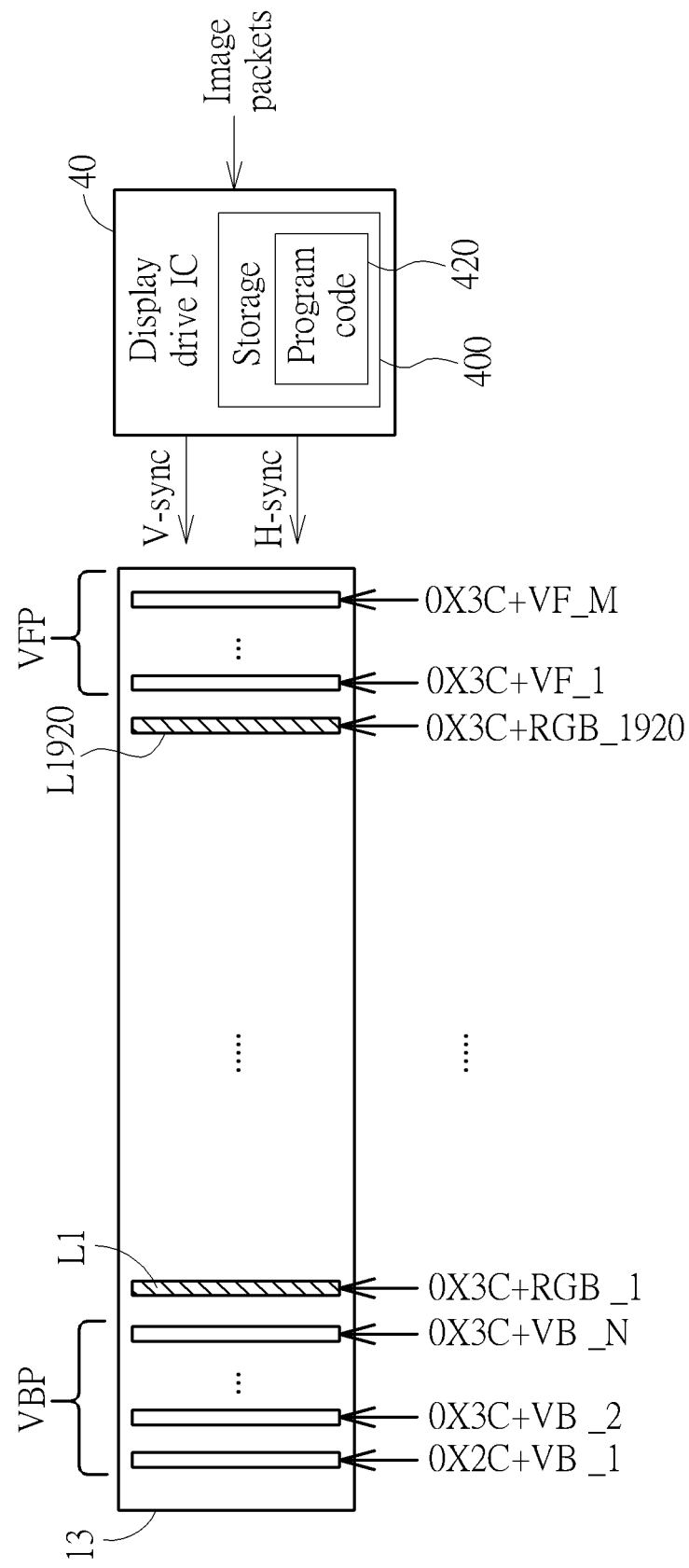
FIG. 4 is a schematic diagram illustrating a RAM-less display drive IC reading image packets in the command mode according to an embodiment of the present invention.

Specifically, please refer to FIG. 4, which is a schematic diagram illustrating a RAM-less display drive IC 40 reading image packets in the command mode according to an embodiment of the present invention. The display drive IC 40 includes a storage 400 for storing hardware information of the panel 13, e.g. information of active and non-active areas, and storing a program code 420 to be accessed by the display drive IC 40, such that the display drive IC 40 may perform reading image packets accordingly. Before the processor 11 transmits frame data or image packets to the panel 13, the processor 11 has to retrieve the hardware information of the panel 13 to acquire ranges of the active and non-active areas and generate image packets corresponding to the active and non-active areas. In FIG. 4, the display lines L1-L1920 having slash patterns may indicate an active area; while blank display lines may indicate a non-active area. Assume a resolution of the panel 13 is 1080RGB×1920, a data amount of a vertical back porch VBP of the non-active area is 1080RGB*(N), a data amount of a vertical front porch VFP of the non-active area is 1080RGB*(M). According to protocols based on the command mode, the processor 11 may sequentially transmit the following write formats and packets to the display drive IC 40:

write format 0X2C, non-active packet VB_1
. . .
write format 0X3C, non-active packet VB_N
write format 0X3C, active packet RGB_1
. . .
write format 0X3C, active packet RGB_1920
write format 0X3C, non-active packet VF_1
. . .
write format 0X3C, non-active packet VF_M

The display drive IC 40 may generate the vertical synchronization signal V-sync if the write format is 0X2C. The display drive IC 40 may generate the horizontal synchronization signal H-sync if the write format is 0X3C. In such a situation, although the processor 11 uses the command mode to transmit the frame data, the display drive IC 40 may by itself generate the synchronization signals V-sync and H-sync according to the write formats 0X2C and 0X3C and use the video mode to read the non-active packets VB_1-VB_N, the non-active packets VF_1-VF_M and the active packets RGB_1-RGB_1920.

In other words, the processor 11 further uses the command mode to transmit the non-active packets VB_1-VB_N and VF_1-VF_M, such that the display drive IC 40 may use the video mode to read the frame data, so as to save a circuit area of a memory. The non-active packets VB_1-VB_N may be regarded as the vertical back porch VBP, and the non-active packets VF_1-VF_M may be regarded as the vertical front porch VFP. Moreover, the processor 11 uses the command mode, thereby the frame data is transmitted only when the frame data needs to be updated, which saves system resources and power consumption compared with the traditional video mode.

Note that, in the video mode, the non-active packets VB_1-VB_N and VF_1-VF_M and the active packet RGB_1-RGB_1920 must have a same data amount, such that the synchronization signals V-sync and H-sync generated by the display drive IC 40 according to the write formats 0X2C and 0X3C have constant periods to regularly display the frame data on the panel 13.

Figure 5:
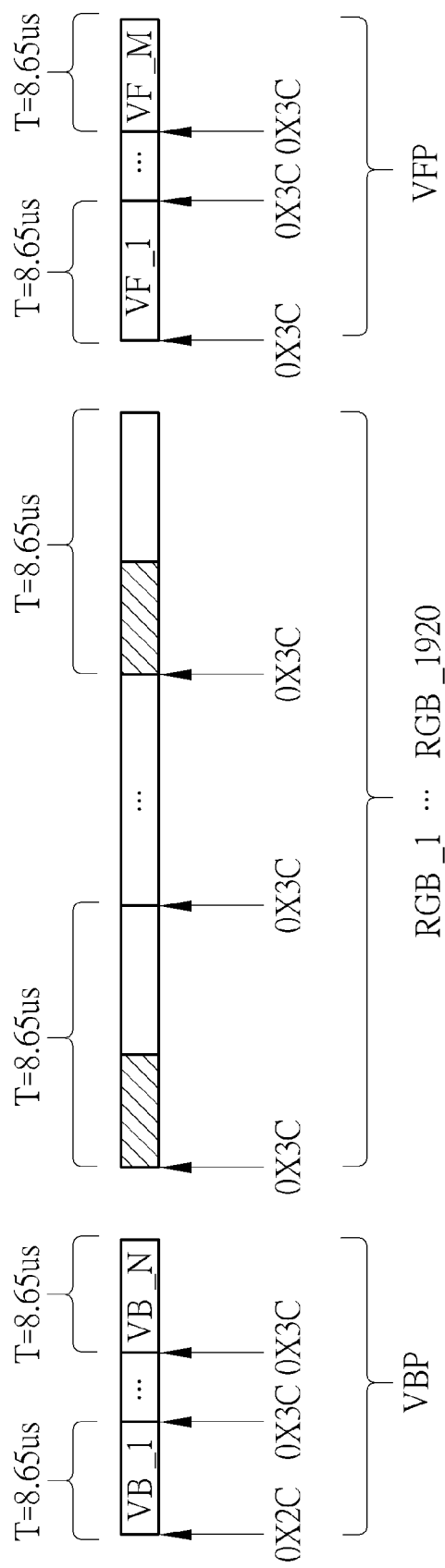
FIG. 5 is a schematic diagram illustrating a set of frame data according to an embodiment of the present invention.

Please refer to FIG. 5, which is a schematic diagram illustrating a set of frame data according to an embodiment of the present invention. Assume that a frame rate of the panel 13 is 60 Hz, a vertical back porch is 2, a vertical front porch is 6 and a resolution of the frame is 1080RGB×1920, and a period T of each of horizontal display lines on the panel 13 may be denoted with:

16.67 milliseconds/(2+1920+6)=8.65 microseconds

Therefore, when the processor 11 is transmitting the fame data, between the write formats 0X2C and 0X3C or two of the write formats 0X3C is inserted with one of the non-active packets VB_1-VB_N and VF_1-VF_M and the active packets RGB_1-RGB_1920 having the same period T (i.e. 8.65 microseconds), such that the display drive IC 40 may generate the periodic synchronization signals V-sync and H-sync according to the write formats 0X2C and 0X3C to ensure the frame data is regularly displayed on the panel 13.

In practice, regarding data formats defined in the command mode, the non-active packets VB_1-VB_N, VF_1-VF_M may include null packets and blank packets, wherein a write format of a null packet may be any RGB pixel data (e.g. 0X00, 0X09 or 0XAA), and a write format of a blank packet may be a low power write format (e.g. LP-11). Each of the active packets RGB_1-RGB_1920 may include at least pixel data and a blank packet, wherein the pixel data is denoted with slash patterns and the blank packet is blank.

Figure 6:
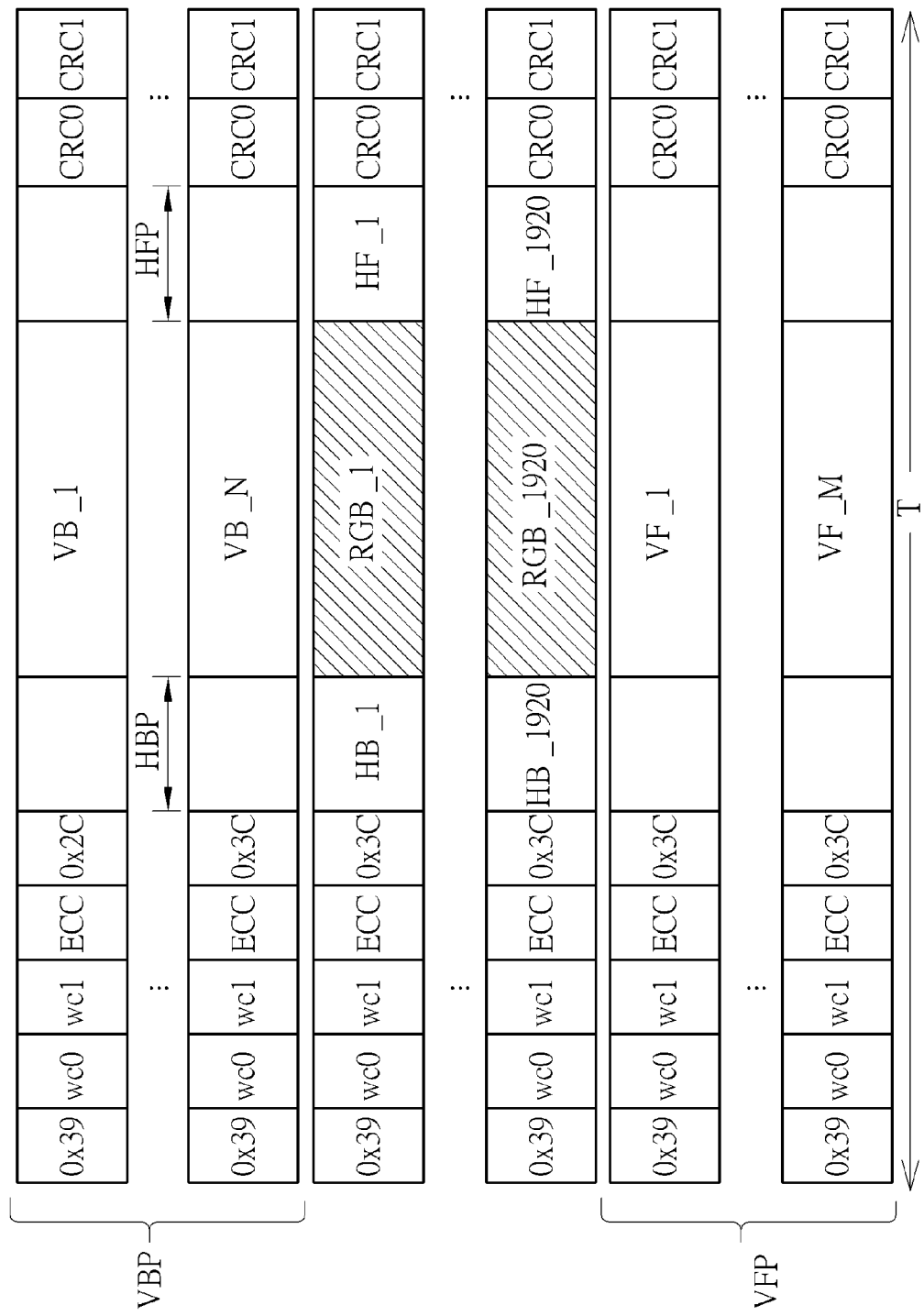
FIG. 6 is a schematic diagram illustrating a set of frame data according to another embodiment of the present invention.

Please refer to FIG. 6, which is a schematic diagram illustrating a set of frame data according to another embodiment of the present invention. A difference between FIG. 5 and FIG. 6 is that the set of frame data shown in FIG. 5 includes the vertical back porch VBP and the vertical front porch VFP; while the set of frame data shown in FIG. 6 includes the vertical back porch VBP, the vertical front porch VFP, the horizontal back porch HBP and the horizontal front porch HFP. Assume that a resolution of the panel 13 is 1080RGB*1920. According to protocols based on the command mode, the processor 11 may sequentially transmit the following write formats and image packets to the display drive IC 40:

write format 0X2C, non-active packet VB_1
. . .
write format 0X3C, non-active packet VB_N
write format 0X3C, non-active packet HB_1, active packet RGB_1, non-active packet HF_1
. . .
write format 0X3C, non-active packet HB_1920, active packet RGB_1920, non-active packet HF_1920
write format 0X3C, non-active packet VF_1
. . .
write format 0X3C, non-active packet VF_M

The display drive IC 40 may generate the vertical synchronization signal V-sync if the write format is 0X2C. The display drive IC 40 may generate the horizontal synchronization signal H-sync if the write format is 0X3C. In such a situation, although the processor 11 uses the command mode to transmit the frame data, the display drive IC 40 may by itself generate the synchronization signals V-sync and H-sync according to the write formats 0X2C and 0X3C and use the video mode to read the non-active packets VB_1-VB_N and VF_1-VF_M, the non-active packets HB_1-HB_1920 and HF_1-HF_1920 and the active packets RGB_1-RGB_1920.

In practice, regarding data formats defined in the command mode, the non-active packets VB_1-VB_N and VF_1-VF_M and the non-active packets HB_1-HB_1920 and HF_1-HF_1920 may include null packets and blank packets, wherein a write format of a null packet may be any RGB pixel data (e.g. 0X00, 0X09 or 0XAA) which may be ignored by the display drive IC 40 and not displayed by the panel 13. Similarly, each of the horizontal display lines of the panel 13 has the same period T to ensure the frame data is regularly displayed by the panel 13. In addition, FIG. 6 also illustrates write formats such as 0X39, WC0, WC1, ECC, CRC0 and CRC1, which are defined in the MIPI and should be well known in the art.

Figure 7:
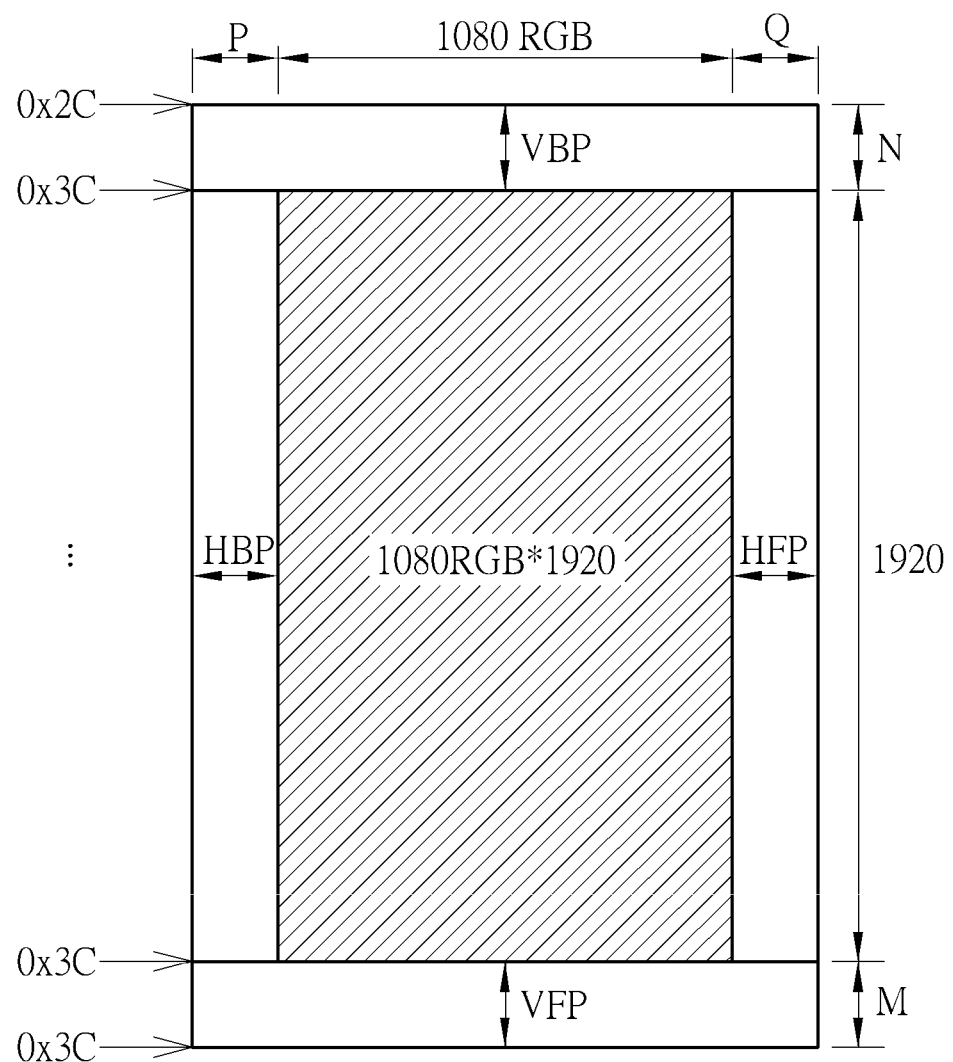
FIG. 7 is a schematic diagram illustrating a data distribution of the frame data displayed on the panel shown in FIG. 6.

Please refer to FIG. 7, which is a schematic diagram illustrating a data distribution of the frame data displayed on the panel 13 shown in FIG. 6. In FIG. 7, an active area is denoted with slash patterns, a non-active area is blank. In the non-active area of the panel 13, a data amount of the vertical back porch VBP is (P+1080+Q)RGB*N, a data amount of the vertical front porch VFP is (P+1080+Q)RGB*M, a data amount of the horizontal back porch HBP is (P)RGB*1920, a data amount of the horizontal front porch HFP is (Q)RGB*1920, wherein P and Q are pixel numbers of the non-active area, and M and N are numbers of the horizontal lines of the non-active area.

Figure 8:
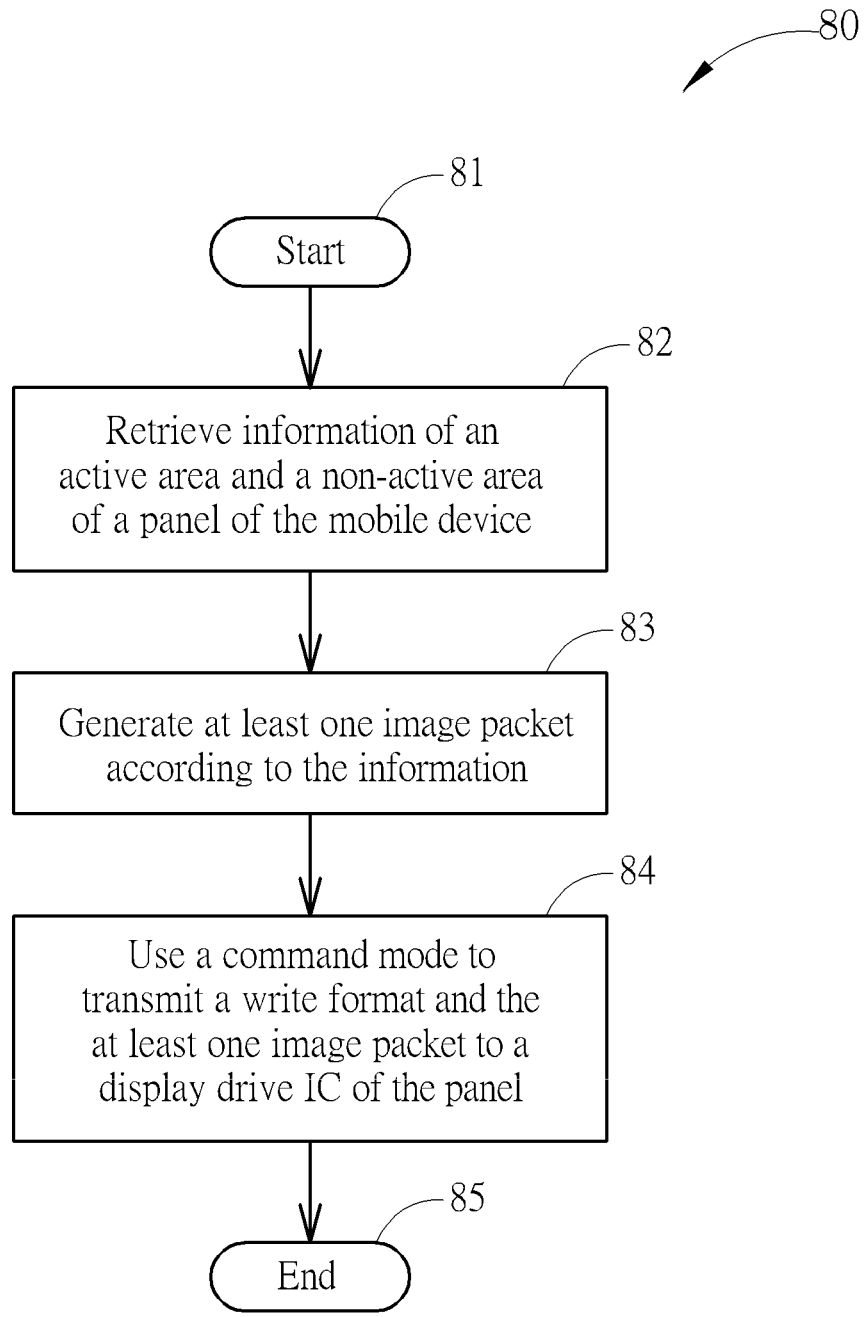
FIG. 8 is a schematic diagram of a process of transmitting data according to an embodiment of the present invention.

Operations related to using the command mode to transmit image packets in the mobile device 1 may be summarized into a process of transmitting data 80 and be compiled into the program code 120. As shown in FIG. 8, the process of transmitting data 80 may include the following steps:

Step 81: Start

Step 82: Retrieve information of an active area and a non-active area of a panel of the mobile device.

Step 83: Generate at least one image packet according to the information.

Step 84: Use a command mode to transmit a write format and the at least one image packet to a display drive IC of the panel.

Step 85: End.

Detailed description of the process of transmitting data 80 may be obtained by referring to above description, which is omitted.

Figure 9:
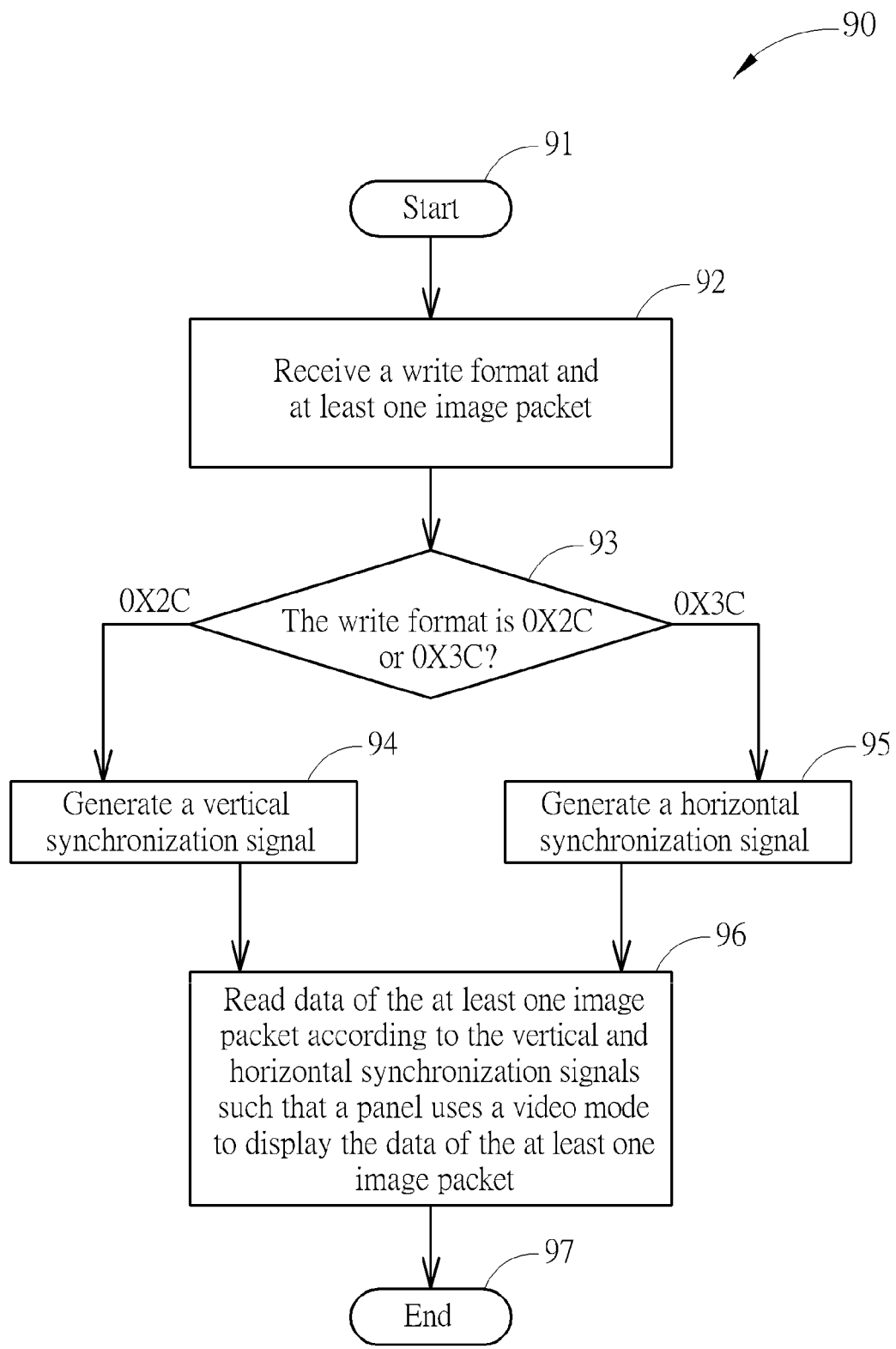
FIG. 9 is a schematic diagram of a process of reading data according to an embodiment of the present invention.

Operations related to using the video mode to read data of image packets in the mobile device 1 may be summarized into a process of reading data 90 and be compiled into the program code 420. As shown in FIG. 9, the process of reading data 90 may include the following steps:

Step 91: Start.

Step 92: Receive a write format and at least one image packet.

Step 93: Go to Step 94 if the write format is 0X2C; and go to Step 95 if the write format is 0X3C.

Step 94: Generate a vertical synchronization signal. Go to Step 96.

Step 95: Generate a horizontal synchronization signal.

Step 96: Read data of the at least one image packet according to the vertical and horizontal synchronization signals such that a panel uses a video mode to display the data of the at least one image packet.

Step 97: End.

Detailed description of the process of transmitting data 90 may be obtained by referring to above description, which is omitted.

To sum up, in the traditional video mode, even in a static image, the processor has to continuously monitor a request from an operating system for updating images, transmit image packets to the display drive IC, which not only wastes system resources but also increases the power consumption of the mobile device. In the traditional command mode, the display drive IC has to store image data in a built in storage (e.g. an SRAM), which increases a circuit area and a production cost of the display drive IC. In comparison, the active and non-active areas of the panel of the present invention may be defined, such that the processor may use the command mode to generate active and non-active packets. Afterwards, the display drive IC may by itself generate synchronization signals according to write formats corresponding to the active and non-active packets, such that the display drive IC may use the video mode to drive the panel to display data of the active packets. As a result, the present invention may pick up the advantage of the ram-less drive IC under the video mode and an advantage of self generating synchronization signals under the command mode.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of reading data for a display drive integrated circuit (IC) of a panel of a mobile device, comprising:
   receiving a plurality of write formats and a plurality of image packets, wherein each of the write formats is associated with one of the image packets, and each of the image packets corresponds to one display line of a plurality of display lines of the panel, wherein a processor of the mobile device uses a command mode to transmit the write format and the at least one image packet to the display drive IC, wherein each of at least one of the write formats indicates respective information for the display line corresponding to the image packet associated with the write format; and
   generating a synchronization signal according to the respective information indicated by the write format for displaying at least one of the display lines of the panel.

2. The method of claim 1, wherein the synchronization signal is a vertical synchronization signal or a horizontal synchronization signal depending on the information indicated by the write format.

3. The method of claim 2, wherein generating the synchronization signal according to the respective information indicated by the write format comprises:
   generating the vertical synchronization signal if the write format indicates first information; and
   generating the horizontal synchronization signal if the write format indicates second information.

4. The method of claim 2, wherein the panel comprises an active area and a non-active area, and the at least one image packet is an active packet or a non-active packet.

5. The method of claim 1, wherein the video mode conforms to a mobile industry processor interface.

6. The method of claim 1, wherein generating the synchronization signal according to the respective information indicated by the write format comprises generating a different type of the synchronization signal when the information of the write format is different.

7. A method of transmitting data for a processor of a mobile device, comprising:
   retrieving information of an active area and a non-active area of a panel of the mobile device;
   generating a plurality of image packets according to the information; and
   using a command mode to transmit a plurality of write formats and the plurality of image packets to a display drive integrated circuit (IC) of the panel, wherein each of the write formats is associated with one of the image packets, and each of the image packets corresponds to one display line of a plurality of display lines of the panel, wherein each of at least one of the write formats indicates respective information for the display line corresponding to the image packet associated with the write format.

8. The method of claim 7, wherein the write format indicates a vertical synchronization signal if the write format indicates first information, and the write format indicates a horizontal synchronization signal if the write format indicates second information.

9. The method of claim 7, wherein the at least one image packet is an active packet or a non-active packet.

10. The method of claim 7, wherein the command mode conforms to a mobile Industry processor interface.

11. A mobile device, comprising:

a storage for storing a program code corresponding to a method of transmitting data;

a processor coupled to the storage for processing the program code to execute the method of data transmission, wherein the method of transmitting data comprises:

retrieving information of an active area and a non-active area of a panel of the mobile device;

generating a plurality of image packets according to the information; and using a command mode to transmit a plurality of write formats and the plurality of image packets to a display drive integrated circuit (IC) of the panel, wherein each of the write formats is associated with one of the image packets, and each of the image packets corresponds to one display line of a plurality of display lines of the panel, wherein each of at least one of the write formats indicates respective information for the display line corresponding to the image packet associated with the write format; and a display drive IC coupled between the panel and the processor for executing a process of reading data of the plurality of image packets, wherein the process of reading data comprises:

receiving the plurality of write formats and the plurality of image packets; and generating a synchronization signal according to the respective information indicated by the write format for displaying at least one of the display lines of the panel.

12. The mobile device of claim 11, wherein the synchronization signal is a vertical synchronization signal or a horizontal synchronization signal depending on the information indicated by the write format.

13. The mobile device of claim 12, wherein generating the synchronization signal according to the write format of the process of reading data comprises:

generating the vertical synchronization signal if the write format indicates first information; and generating the horizontal synchronization signal if the write format indicates second information.

14. The mobile device of claim 11, wherein the at least one image packet is an active packet or a non-active packet.

15. The mobile device of claim 11, wherein the mobile device conforms to a mobile industry processor interface.

16. The mobile device of claim 11, wherein the display drive IC comprises a storage for storing a program code corresponding to the process of reading data and the information of the active area and the non-active area of the panel.

17. The mobile device of claim 11, wherein generating the synchronization signal according to the respective information indicated by the write format comprises generating a different type of the synchronization signal when the information of the write format is different.

* * * * *